June 11, 1940.  C. J. COBERLY  2,204,120
LIQUID OPERATED MOTOR
Filed April 11, 1934   5 Sheets-Sheet 1

INVENTOR:
CLARENCE J. COBERLY.
By Fred W. Harris
ATTORNEY.

June 11, 1940.       C. J. COBERLY       2,204,120
LIQUID OPERATED MOTOR
Filed April 11, 1934       5 Sheets-Sheet 2

INVENTOR:
CLARENCE J. COBERLY,
By
Fred W. Lewis
ATTORNEY.

June 11, 1940.  C. J. COBERLY  2,204,120
LIQUID OPERATED MOTOR
Filed April 11, 1934   5 Sheets-Sheet 3

INVENTOR:
CLARENCE J. COBERLY.
By Fred W. Harris
ATTORNEY.

June 11, 1940.   C. J. COBERLY   2,204,120
LIQUID OPERATED MOTOR
Filed April 11, 1934   5 Sheets-Sheet 4

INVENTOR:
CLARENCE J. COBERLY.
By Fred W Lain
ATTORNEY.

June 11, 1940.                C. J. COBERLY                2,204,120
                           LIQUID OPERATED MOTOR
                          Filed April 11, 1934        5 Sheets-Sheet 5

INVENTOR
CLARENCE J. COBERLY
BY
ATTORNEY.

Patented June 11, 1940

2,204,120

UNITED STATES PATENT OFFICE 2,204,120

LIQUID OPERATED MOTOR

Clarence J. Coberly, Los Angeles, Calif., assignor to RoKo Corporation, Reno, Nev., a corporation of Nevada Application April 11, 1934, Serial No. 720,057

22 Claims. (Cl. 121—150)

My invention relates to a fluid operated motor and to a simplified and improved valve structure. The present application is a continuation-in-part of my copending application Serial No. 623,171, filed July 18, 1932, now Patent 2,081,220 granted May 25, 1937, and entitled Liquid operated pump.

My present invention is of especial utility in fluid motors for use with pumps disposed at the bottoms of deep wells for the purpose of pumping oil therefrom, and accordingly it is deemed advisable in the hereinafter disclosure to show the invention as applied to such use. As is well known, the conditions encountered in the drilling of deep wells make it necessary to reduce the size of casings or liners as the well is continued downwardly. Accordingly, at the bottom of a deep well the pipe which enters the oil formation may be often as small as 2½" in diameter. The space limitations thus produced make the design of the deep well pump exceedingly difficult, especially with relation to that type of pump known as a "fluid operated pump," in which the pumping piston and a motor therefor are combined in one small structure which is disposed within the casing at substantially the bottom of the well.

My present invention contributes to the making of a pump of this character which will operate satisfactorily for relatively long periods of time and with a relatively high efficiency as compared with pumps known to the inventor at the present time.

It is an object of the invention to provide in a fluid motor of the above character a simple valve mechanism for controlling the delivery of fluid under pressure to the motor cylinder, this valve mechanism being fluid operated and positive in its action.

An object of the invention is to provide a valve mechanism having a sliding valve part which is moved between primary and secondary positions by controlled fluid pressure, and which has means for locking it in such positions during such times as movement thereof is not intended.

It is an object of the invention to provide a means for controlling the flow and application of pressure fluids in the mechanism in such a manner that sudden shocks of fluid pressure against the walls of the device are prevented, and so that the movements of fluid actuated parts are controlled in the characteristic manners hereinafter set forth.

A further object of the invention is to provide a simple means for controlling the stopping movement of the valve to assist in accomplishing the control of fluid under pressure as set forth in the preceding paragraph, for preventing the hammering of the valve against the end walls of the chambers in which it operates, and also for producing a slow starting movement of the valve as it leaves its position of rest.

In the operation of the device a somewhat harmonic action is produced. The fluid pressures in the fluid passages and chambers gradually build up and recede, and the moving parts have controlled acceleration and deceleration. In such manner the structure of the pumping device is to the greatest possible extent relieved of the sudden application of forces and the shocks resulting therefrom.

Further objects and advantages of the invention will be made evident throughout the following part of the specification.

Referring to the drawings, which are for illustrative purposes only.

Figures 1, 2:
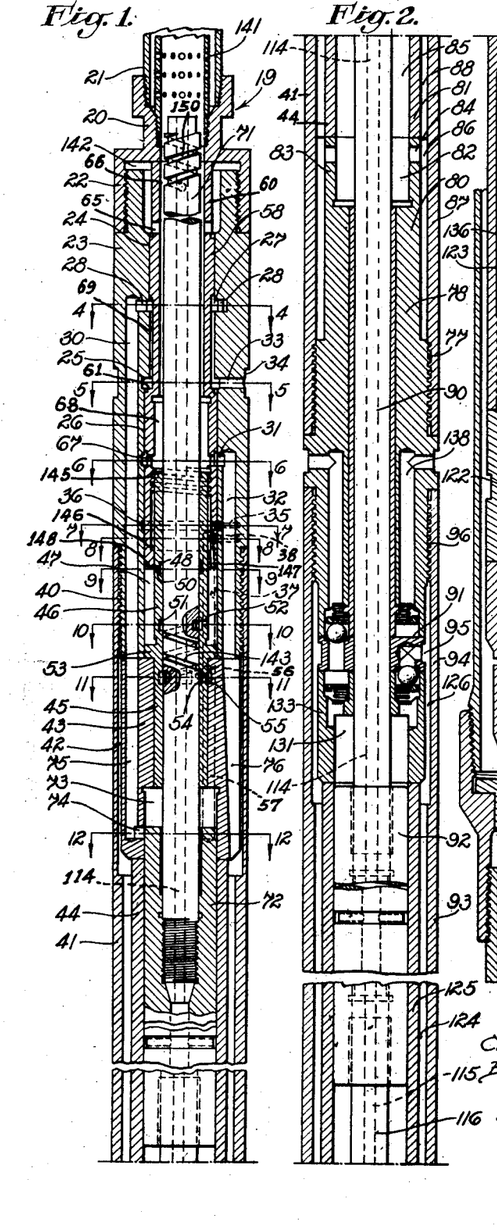
Fig. 1 is a vertically sectioned view showing the upper end of a fluid operated pump embodying my invention.
Fig. 2 is a vertically sectioned view complementary to Fig. 1, showing the central section of the pump.
Figure 3:
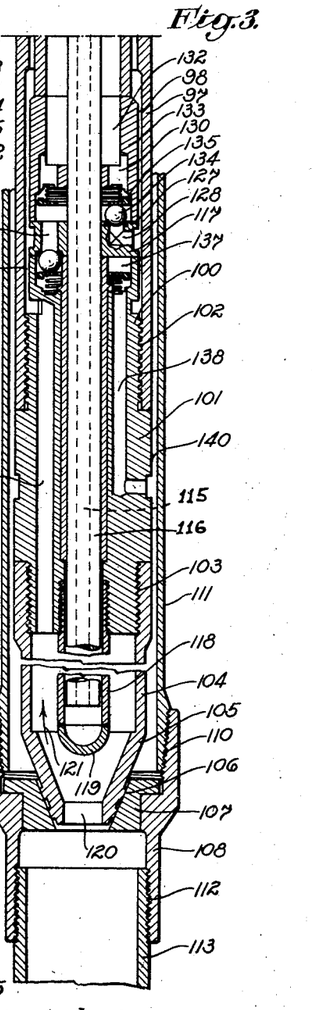
Fig. 3 is a vertically sectioned view complementary to Fig. 2, showing the lower end section of the pump.

In the pump structure 19, Figs. 1, 2, and 3, embodying my present invention, I employ an upper fitting 20 by which the pump structure is secured to the lower end of a fluid delivery pipe 21 by which operating fluid under relatively high pressure is delivered to the motor section of the pump structure 19. The fitting 20 has a threaded portion 22 for connection to the upper end of a valve body or valve casing 23. The valve body 23 has an axial minor bore 24 formed in the upper part thereof, which minor bore 24 is separated by a circular channel 25 from a major bore 26 axially formed in the lower portion of the valve body 23.

Figure 6:
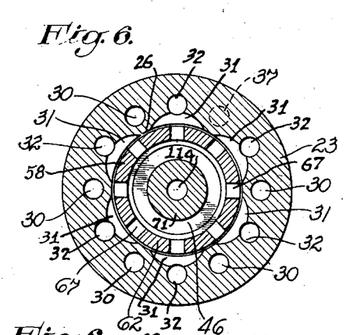
Fig. 6 is a cross-section on a plane represented by the line 6—6 of Fig. 1.

Substantially intermediately between the ends of the minor bore 24 is a circular channel 27 which communicates through ports 28 with the upper ends of primary fluid passages 30 which extend within the wall of the valve body 23 to the lower end thereof. Spaced below the channel 25 in the major bore 26 are a plurality of secondary ports 31 communicating with the upper ends of secondary fluid passages 32 which are formed co-axially within the wall of the valve body 23 and are placed between the passages 30, as shown in Fig. 6, and which secondary passages 32 extend to the lower end of the valve body 23. As further shown in Fig. 6, the ports 31 constitute circular depressions formed in the inner face of the major bore 26, preferably by the use of circular milling cutters.

Figures 4, 5, 17:
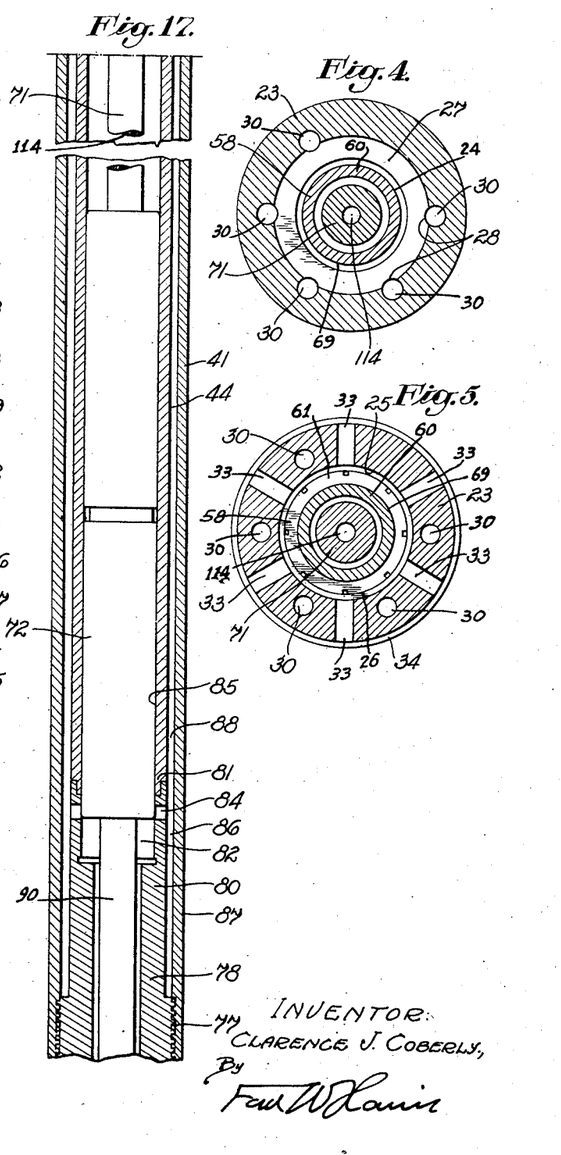
Fig. 4 is a slightly enlarged cross-section on a plane represented by the line 4—4 of Fig. 1.
Fig. 5 is an enlarged cross-section on a plane represented by the line 5—5 of Fig. 1.
Fig. 17 is a vertically sectioned view showing the motor piston of the invention in the lowered position thereof when the pilot rod is likewise in lowered position as shown in Fig. 16.
Figure 7:
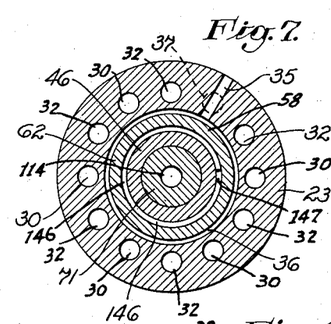
Fig. 7 is an enlarged cross-section on a plane represented by the line 7—7 of Fig. 1.
Figures 8, 9, 10, 11, 12, 13:
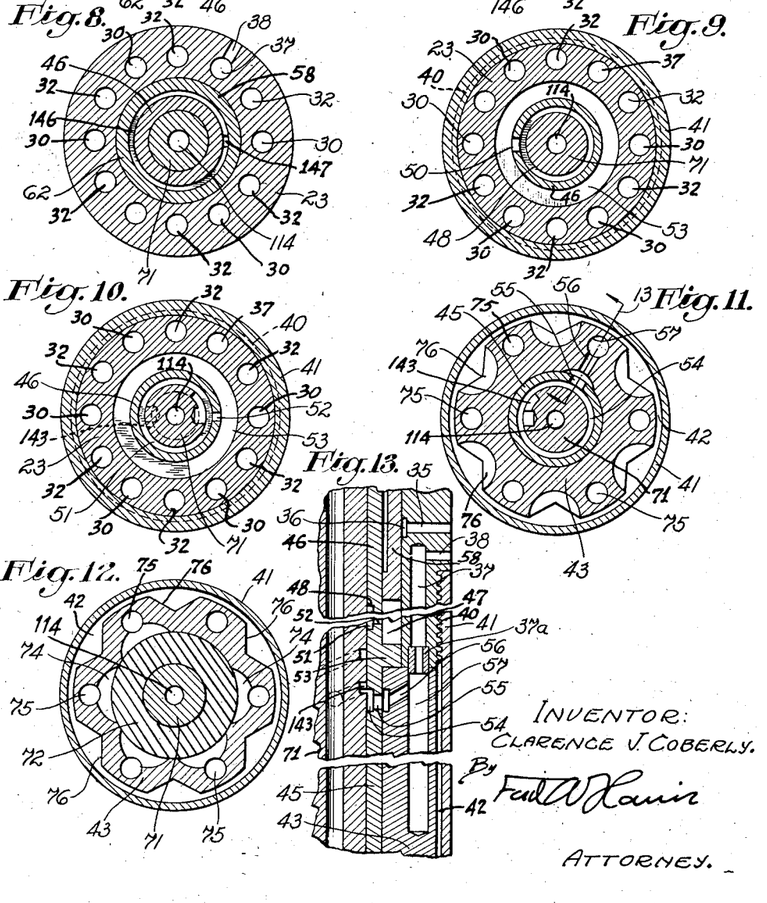
Fig. 8 is an enlarged cross-section on a plane represented by the line 8—8 of Fig. 1.
Fig. 9 is a cross-section on a plane represented by the line 9—9 of Fig. 1.
Fig. 10 is an enlarged cross-section on a plane represented by the line 10—10 of Fig. 1.
Fig. 11 is an enlarged cross-section on a plane represented by the line 11—11 of Fig. 1.
Fig. 12 is an enlarged cross-section on a plane represented by the line 12—12 of Fig. 1.
Fig. 13 is a fragmentary section on a vertical plane taken as indicated by the line 13 of Fig. 11.

As shown in Fig. 5 and also in Fig. 1, a plurality of discharge ports 33 connect the channel 25 with a channel 34 formed in the outer face of the valve body 23. As shown in Figs. 1 and 7, an auxiliary discharge channel or passage 35 connects between the exterior of the valve body 23 and a small channel 36 formed within the major bore 26 below the ports 31. As shown in Figs. 1, 8, and 13, a passage 37 extends upwardly from the lower end of the valve body 23 in a position between two of the passages 32, as shown by dotted lines in Figs. 6 and 7. The passage 37 accordingly is in the same vertical plane as the port 35 but stops below the port 35. Connecting the upper end of the passage 37 with the exterior of the valve body 23 is a port 38.

To threads 40 formed at the lower end of the valve body 23, a power cylinder 41 is secured, this power cylinder having an axial chamber 42 formed in the upper end thereof for receiving a plug body 43 which is held in fluid-tight engagement with the lower end of the valve body 23 and in fluid-tight engagement with the upper end of a cylinder liner 44 when the power cylinder 41 is connected to the valve body 23 as shown. Mounted in the upper part of the plug 43 is a valve liner 45 having an upper end portion 46 extending upwardly within the major bore 26 of the valve body 23 to a plane disposed a short distance below the ports 31, there being an annular space 47 formed within the major bore 26 around the upper end portion 46 of the valve liner 45. Internally formed intermediate the ends of the upper portion 46 of the valve liner 45 is a channel 48 which communicates with the space 47 through a port 50, and near the lower end of the upper portion 46 is an annular channel 51 which communicates with the space 47 through a port 52. The ports 48, 50, 51, and 52 are shown in the cross-sectional views, Figs. 9 and 10. A shoulder or collar 53 is formed on the valve liner 45 in a position to rest against the upper end of the plug body 43 and to reside within the lower extremity of the major bore 26. Below the horizontal plane of the collar 53, a channel 54 is formed, which, as shown in Figs. 1, 11, and 13, communicates through a port 55 in the wall of the valve liner 45 and a passage 56 in the plug body 43 with a vertical passage 57 which connects with the lower end of the passage 37 formed in the lower portion of the valve body 23, so as to communicate with the exterior of the pump structure through the port 38 disposed at the upper end of the passage 37 as shown in Figs. 8 and 13. To align the passage 37 with the passage 57 a means for preventing rotation of the plug body 43 and the valve body 23 is provided in the form of a small sleeve 37a which is pressed into a counter-bore in the lower end of the passage 37 so as to project into the upper end of the passage 57.

Figures 14, 15:
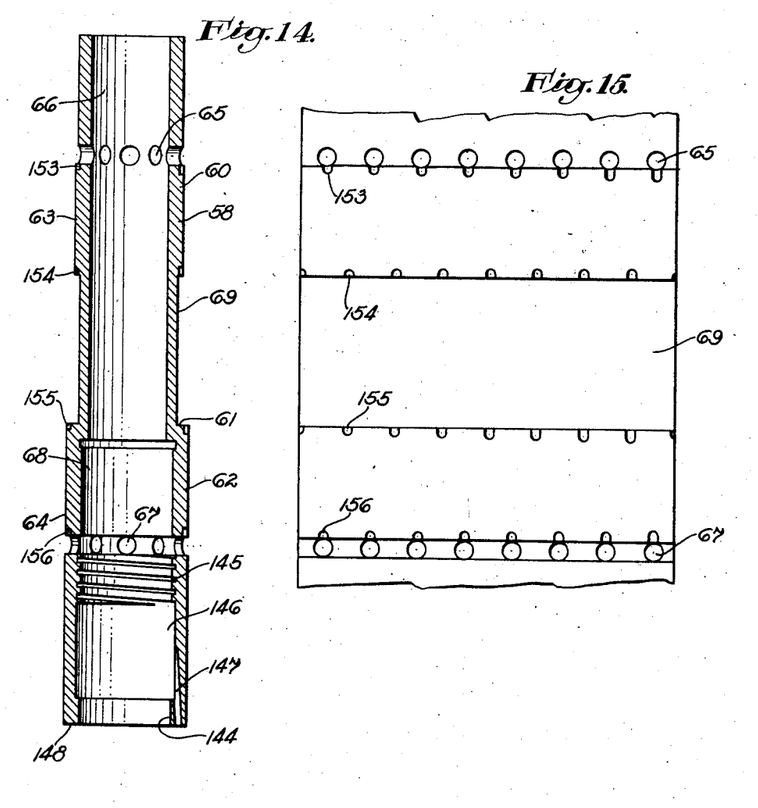
Fig. 14 is an enlarged vertically sectioned view of the valve member forming a part of the invention.
Fig. 15 is a view showing the surface of the valve member of Fig. 14 projected onto a vertical plane for the purpose of showing grooves formed in the surface of the valve member.
Figure 16:
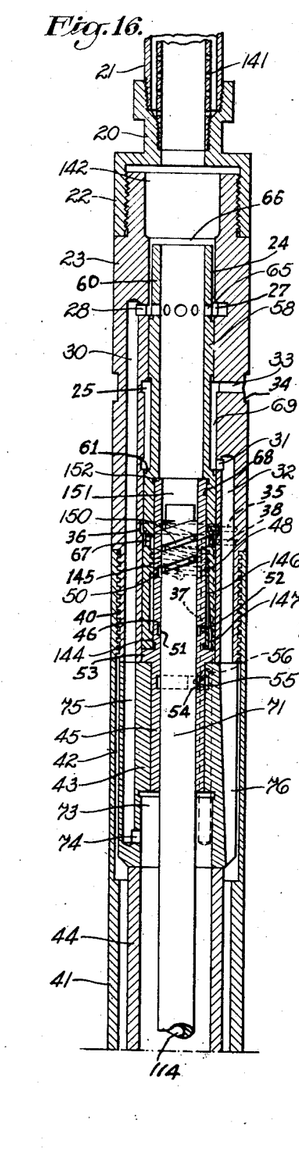
Fig. 16 is a vertically sectioned view corresponding to Fig. 1 but showing the valve member thereof in raised position and the pilot member in lowered position.

Slidable within the valve body 23 is a piston valve 58 which is shown alone in Fig. 14. This valve member 58 is of tubular form and has a minor portion 60 which is separated by a radial shoulder 61 from a major portion 62. The minor portion 60 of the valve member 58 is of smaller diameter than the major portion 62 and has an external surface 63 which fits the minor bore 24 of the valve body 23 in fluid-tight relation. The major portion 62 of the valve member 58 has an external surface 64 which is slidable within and fits the major bore 26 of the valve body 23 in fluid-tight relation. In the upper part of the minor portion 60 of the valve member 58 are primary valve ports 65 which connect the bore 66 of the minor portion 60 with the primary ports 28 at the upper ends of the primary passages 30 when the valve member 58 is in lowered or primary position, as shown in Fig. 16. In the major portion 62 of the valve member 58 are secondary valve ports 67 which connect the bore 68 of the major portion 62 with the secondary ports 31 at the upper ends of the secondary passages 32, when the valve member 58 is in raised or secondary position, as shown in Fig. 1. At the lower end of the minor portion 60 of the valve member 58 is a shallow channel 69 which extends circumferentially around the valve member and constitutes a port for connecting the primary passages 30 with the discharge passage or port 33, as shown in Fig. 1, when the valve member 58 is in raised position, and for connecting the secondary passages 32 with the discharge passage 33, as shown in Fig. 16, when the valve member 58 is in lowered position. Slidable within the bore of the valve liner 45 in fluid-tight relation, and movable within the bore of the valve member 58 in spaced relation thereto, between the raised and lowered positions thereof shown in Figs. 1 and 16, is a pilot rod 71, the lower end of which is connected to the upper end of a power piston 72 adapted to be reciprocated within the power cylinder 41. A cavity 73 formed in the lower end of the plug body 43 constitutes a continuation of the bore of the cylinder liner 44, and the portion thereof above ports 74 forms a dash-pot chamber for holding a body of fluid to stop the upward movement of the power piston 72 with a cushioning effect. The ports 74 communicate with vertical passages 75 formed in the wall of the plug body 43 so as to connect with the lower ends of the primary fluid passages 30 of the valve body 23.

The secondary fluid passages 32, which lead downwardly from the ports 31, connect with fluid passages 76 having the form of grooves in the external face of the plug body 43. The lower end of the power cylinder 41 has threads 77 for connecting it to an intermediate plug 78 which has an upwardly projecting extension 80 adapted to engage the lower end 81 of the liner 44 in fluid-tight engagement. In the upper end of the extension 80 a dash-pot cavity 82 is formed, the side wall 83 thereof having ports 84 which connect the lower cylinder space 85 with an annular space 86 formed between the extension 80 and the wall 87 of the power cylinder 41, which space 86 is connected to the chamber 42 at the upper end of the cylinder 41 by means of co-axial passages 88 which are formed between the cylinder 41 and its liner 44.

A piston rod 90 extends downwardly from the power piston 72 through the intermediate plug 78 and a valve structure 91 disposed at the lower end thereof into engagement with the upper end of a pumping piston 92 which is reciprocable in a pumping cylinder 93. The pumping cylinder 93 has the same characteristics as the power cylinder 41 in having an upwardly extending wall 94 forming a cavity 95 adjacent the lower end of the intermediate plug 78 to which it is connected by means of threads 96. The lower end of the cylinder 93 comprises a downwardly extending wall 97 which forms a cavity 98 adjacent the upper end of an extension 100 forming a part of a lower plug 101 to which the wall 97 is connected by means of threads 102. By means of threads 103, a fitting 104 is connected to the lower end of the lower plug 101, this fitting 104 having a downwardly tapering wall 105 at the lower end thereof adapted to engage a conical seat 106 formed in a valve insert member 107 which is supported in a reducing fitting 108 which is connected by means of threads 110 to the lower end of a string of pipe 111 which extends to the top of the well and is of such diameter that the pump structure may be lowered thereinto into engagement with the seat member 107 as shown in Fig. 3. The lower end of the fitting 108 is threaded at 112 to receive an intake member 113 which forms a gas anchor.

It will be noted that the pilot rod 71, the power piston 72, the piston rod 90, and pumping piston 92 are all equipped with axial passages 114, which passages 114 connect with an axial passage 115 extending through a rod 116 which projects downwardly from the pumping piston 92 through the valve structure 117 contained within the cavity 98, and through the lower plug 101 into a tubular member 118 which extends downwardly from the lower plug 101 and has the lower end thereof closed by means of a wall 119.

Oil from the well, which is to be pumped by the pumping piston 92, passes into the lower end of the pump structure through an opening 120 in the foot fitting 104, upwardly through the space within the fitting 104, as indicated by arrows 121, through co-axial openings 122 formed within the wall of the lower plug 101 into the annular space 123 formed in the cavity 98 around the valve structure 117, and through co-axial passages 124 between the pump cylinder wall 93 and its liner 125, which co-axial passages 124 connect the space 123 with the space 126 in the cavity 95 around the valve structure 91. Each valve structure 91 and 117 includes an annular insert body 127 having three L-shaped passages 128 through which oil may pass from the spaces 123 and 126 and through passages 130 into the upper and lower ends 131 and 132 respectively of pumping cylinder spaces formed within insert bodies 133 which are held against the ends of the liner 125. The inner ends of the passages 128 are normally closed against an outflow of fluid by check valve balls 134 which are urged against the inner ends of the passages 128 by means of spring-pressed rings 135. Also formed in the insert bodies 127 are a plurality of co-axial passages 136 which connect the passages 130 with annular spaces 137 formed respectively in the lower and upper ends of the plugs 78 and 101, there being passages 138 in the plugs 78 and 101 connecting the spaces 137 with the exterior of the plugs and consequently with the annular space 140 formed around the pump structure 19 within the piping 111. Accordingly, in the operation of the pump oil is drawn from the spaces 123 and 126 through the passages 128 into the ends of the pumping cylinder and is forced from the pumping cylinder through the passages 136 and 138 into the space 140 within the piping 111 which carries the discharged oil to the top of the well. The discharge passage 33, Figs. 1 and 5, also connects with the space 140 so that the discharge from the power cylinder combines with the pumped oil in the piping 111 and is conducted to the top of the well.

An important feature of the invention consists in the use of a valve member for controlling the flow of fluid under pressure to the upper and lower ends of the power cylinder, this valve member being moved by fluid pressure from one position to another thereof and being positively held in such positions between the proper times for the movement thereof. The valve member 58 may be reasonably termed a piston valve for the reason that it is moved between the primary and secondary positions thereof shown in Figs. 16 and 1 respectively by pressure of fluid against its ends. The valve structure is very greatly simplified by use of what may be termed the differential principle. In this valve mechanism, as shown in Figs. 1 and 16, fluid under pressure is delivered downwardly through the tube 21 and passes through a screen or filter member 141 into a pressure space 142 formed within the upper end of the valve body 23. Accordingly, the pressure of this fluid is constantly exerted against the upper end face of the piston valve 58 and tends to move the piston valve downwardly from the secondary or raised position in which it is shown in Fig. 1 to the primary or lowered position in which it is shown in Fig. 16. The major portion 62, Fig. 14, of the piston valve 58 is of larger cross-sectional area than the minor portion 60, and means are provided for intermittently producing in the space 47 below the lower end of the piston valve 58 a fluid pressure sufficient to overcome the pressure of fluid in the pressure space 142, to move the piston valve 58 upwardly. Release of the pressure in the space 47 results in a downward movement of the piston valve 58 under pressure of fluid in the pressure space 142.

For purpose of explanation, let it be assumed that with the piston valve 58 in the raised position shown in Fig. 1, fluid under pressure from the space 142 has been applied through the bore of the piston valve 58, ports 67 of the valve member 58, ports 31 of the valve body 23, passages 32, 76, 88, and 84 into the lower cylinder space 85, and that the power piston 72 has been raised from a lowered position such as shown in Fig. 17 to the raised position in which it is shown in Fig. 1. Accordingly, then, it may be assumed that the pilot rod 71 has just reached its raised position so as to bring passage means 143 into a position to connect the port 52 leading into the space 47 with a port 55 which communicates with the space 140 exterior of the pump structure 19 through passages 56, 57, 37, and 38. In a pumping mechanism of the character shown, the pressure in the space 140 of the delivery column 111 may be considered a low fluid pressure in view of the fact that it is substantially one-half the pressure of the fluid applied to the space 142. Accordingly, the bringing of the passage means 143 into conjunction with the ports 52 and 55 will result in a differentiation of the pressure within the space 47 to a low value, and the high fluid pressure in the space 142 will operate to move the valve member 58 downwardly, discharging low pressure fluid outwardly through the port 52 and the passages 143, etc., which are at this time connected thereto as the rod result of the pilot 71 reaching its raised position as hereinbefore described, the result being, therefore, that the valve member will move downwardly from the raised position shown in Fig. 1, in which it connects the primary passage 30 with discharge through the passage 33 and connects the passage 32 with fluid under pressure through the port 31, to its primary position shown in Fig. 16, in which the primary valve ports 65 will connect the primary passages 30 with fluid under pressure through the ports 28, and the shallow channel 69 will move down into such position as to connect the ports 31 at the upper ends of the passages 32 with the discharge port or passage 33; thereby permitting fluid under pressure to flow into the space or cavity 73 at the upper end of the power cylinder, and fluid from the lower cylinder space 85 to discharge through the passage 32 and the ports 31, 69, and 33 into the space 140.

Figure 18:
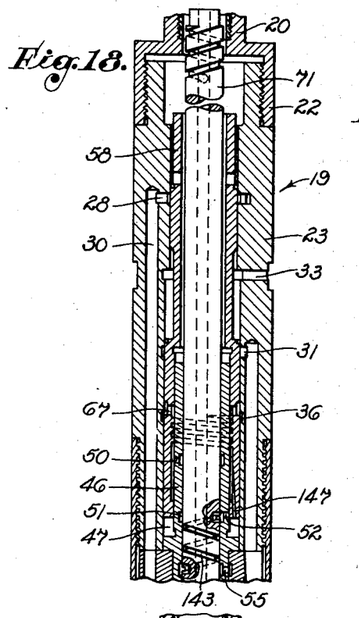
Fig. 18 is a fragmentary sectional view showing the valve member as it approaches lowered position.

An especial feature of the invention is to provide a slow travel of the piston valve 58 as it approaches the point of admission and from there to end of movement. It will be noted that the port 52 leading into the space 47 is disposed a short distance above the bottom of the space and that, as best shown in Fig. 14, the lower end of the piston valve 58 has an annular wall 144 internally formed so as to cover the port 52 when the piston valve 58 nears the lower end of its movement, as shown in Fig. 18, thereby shutting off escape of fluid through the port 52 and the passage means 143 etc., which are at this time connected therewith. The final downward movement of the piston valve 58 is then controlled by an escape of fluid from the extreme lower end of the space 47 through a restricted orifice or restricted passage means consisting of spiral grooves 145, Fig. 14, formed in the bore of the major portion 62 of the valve member 58 above a shallow internal channel or inlet space 146 and below and communicating with the ports 67. A passage 147 is formed in the lower end of the piston valve 58 so as to connect the space 146 with the lower end face 148 of the piston valve 58. At the time the wall portion 144 of the piston valve 58 first closes the port 52, the ports 67 of the piston valve 58 will connect with the channel 36 which is in communication through a passage 35 with the discharge fluid in the space 140 exterior of the valve body 23, and fluid from the lower end of the space 47 below the end 148 of the piston valve 58 may flow upwardly through the passage 147, the space 146, and slowly through the restricted orifice means represented by the long spiral groove 145, thence through the ports 67, the channel 36, and the passage 35 to the exterior, thereby permitting the piston valve 58 to move but slowly to its extreme lowered position. I believe that the spiral passage 145, Fig. 14, is of material importance in the structure, since an orifice is thereby formed which is of large cross-sectional area so that it will not readily clog, but which at the same time is of such character that a frictional head will be produced causing a restricted flow of fluid therethrough.

Figure 19:
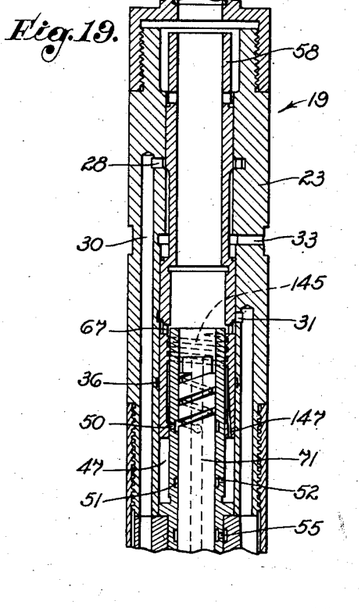
Fig. 19 is a fragmentary sectional view similar to Fig. 18, showing the valve member as it approaches raised position.

When the piston valve 58 reaches its lowered or primary position, as shown in Fig. 16, the power piston 72 will be moved downwardly as the result of the application of fluid under pressure from the space 142 through the primary passage 30 and associated passage and port means, as hereinbefore described. When the power piston 72 reaches the lower end of its downward movement, as shown in Fig. 17, passage means 150 formed near the upper end of the pilot rod 71 will be brought into the position in which it is shown in Fig. 16, connecting the upper part 151 of the bore of the liner 45, which now contains fluid under high pressure, with the channel 48 in the bore of the liner 45, which channel connects through a port 50 with the space 146 below the spiral grooves 145. Accordingly, fluid under high pressure is then conducted through the space 146 and the passage 147 into the extreme lower end of the space 47 below the major portion 62 of the piston valve 58. The pressure of fluid now exerted against the lower end face 148 of the piston valve 58 will be the same as the pressure of fluid exerted against the upper end of the piston valve 58, but in view of the fact that the area of the lower end of the piston valve 58 is greater than the area of the upper end, the piston valve 58 will be forced to move upwardly from the position in which it is shown in Fig. 16 toward the position in which it is shown in Fig. 1. As the piston valve 58 moves upwardly, the wall 144 at the lower end thereof will cover the port 50 as shown in Fig. 19, so that fluid under pressure can no longer enter therethrough; but, at this time the ports 67 will have reached the upper end 152 of the valve liner 45, and a restricted flow of fluid through the orifice means represented by the spiral 145 and through the space 146 and the passage 147 into the space or chamber 47 will slowly complete the upward movement of the piston valve 58 to its secondary position shown in Fig. 1. The passage means 143 and 150 formed upon the pilot rod 71 are also of tortuous, flow-restricting form in that they are helically directed, as shown. These passage means 143 and 150 are of comparatively large cross-sectional area but serve to restrict the passage of fluid from and to the space 47 owing to the frictional resistance to the flow of fluid therethrough.

An additional important element of my invention consists of a simple means for locking the piston valve 58 in both primary and secondary positions. This effect is accomplished by an auxiliary control of the fluid pressure against the ends of the piston valve 58, and this purpose is served by the spiral orifice 145 formed internally of the major portion 62 of the piston valve 58. It will be noted that while the pilot rod 71 is traveling downwardly from its raised position and before the pilot rod has reached the position in which it is shown in Fig. 16, when the piston valve 58 is in its secondary position, the upper end of the spiral groove 145 communicates through the ports 67, the channel 36, and the passage 35 with fluid under low or discharge pressure in the space 140 surrounding the pump structure 19. During this time any leakage of fluid under pressure past the pilot rod 71 cannot exert an upwardly motivating force against the lower end of the piston valve 58 for the reason that such leakage fluid may pass out through the spiral groove 145, the ports 67, the channel 36, and the passage 35 to the space within the discharge column 111. Likewise, during the time the piston valve is in raised position, as shown in Fig. 1, and the pilot rod 71 is traveling upwardly, the space 47 will be open to fluid under pressure through the spiral groove 145, the space 146, and the passage 147, the groove 145 being of such capacity that it will supply fluid under pressure faster than fluid can escape from the space through the port 52 and around the pilot rod below the port 52.

In my invention I reduce vibration to a minimum by modulating control of the delivery of fluid under pressure to the upper and lower ends of the power cylinder. As shown in Figs. 14 and 15, short channels 153, 154, 155, and 156 are formed respectively in the outer surface of the piston valve 58 so as to connect with the ports 65, the upper end of the shallow channel 69, the lower end of the shallow channel 69, and the ports 67, these short channels 153, 154, 155, and 156 varying from minimum to maximum length, as shown in Fig. 15. The result of this construction is that when the piston valve 58 moves downwardly from the secondary position in which it is shown in Fig. 1 and approaches the primary position in which it is shown in Fig. 16, its movement will be slowed, as previously described, just before the ports 65 reach the ports 28 and then the first communication of the valve ports 65 with the ports 28 will be through the short channels 153. This causes a slow introduction of fluid into the upper ends of the passages 30 and reduces hammering or pulsating effect to a minimum. Likewise, as the lower edge of the shallow channel 69 of the piston valve 58 approaches the ports 31, there will be a slow opening of the upper ends of the passages 32 to discharge pressure through the short channels 155. The short channels 154 and 156 operate in a similar flow modulating manner with respect to the ports 31 and 28 as the piston valve 58 slowly moves into fully raised or secondary position of Fig. 1.

Figure 20:
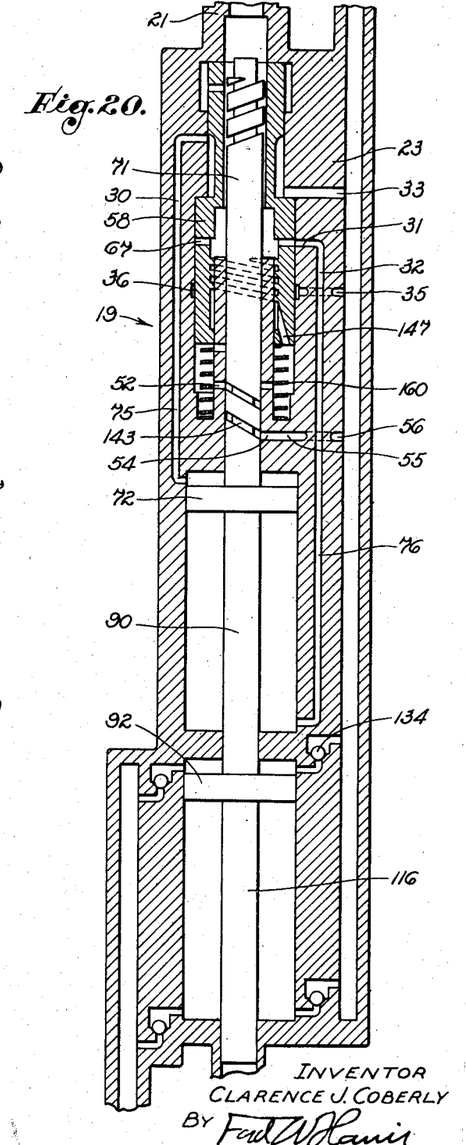
Fig. 20 is a diagrammatic sectional view of the pumping mechanism showing the use of a spring for holding the valve member in raised position.

In Fig. 20 I diagrammatically show the pump structure hereinbefore described, with the addition of a spring 160 which forces upwardly against the lower end of the valve 58 to raise the same to its highest position, as shown in Fig. 20. This spring 160 does not interfere with the ordinary operation of the valve by fluid pressure as hereinbefore described, but may serve during periods of inactivity of the pump, when no fluid pressure is applied to operate the same, to prevent the valve 58 from lodging in an intermediate position and to hold the valve in raised position so that the operation of the pumping device can be started without difficulty by the application of fluid under pressure through the delivery piping 21.

Although I have herein shown and described my invention in simple and practical form, it is recognized that certain parts or elements thereof are representative of other parts, elements, or mechanisms which may be used in substantially the same manner to accomplish substantially the same results; therefore, the invention is not to be limited to the details disclosed herein but is to be accorded the full scope of the following claims.

I claim as my invention:

1. In a fluid motor having a piston operative within a cylinder member, the combination of: a valve member adapted to control the application of fluid under pressure to said piston, said valve member being of annular cross-section and having a major portion and a minor portion of smaller cross-sectional area than said major portion; a valve body in which said valve member slides, said valve body fitting the major and minor portions of said valve member in fluid-tight relation; means forming a chamber adjacent the end of said minor portion of said valve member; means for maintaining fluid under high pressure in said chamber; walls forming a space adjacent the end of said major portion of said valve member; control means so formed as to connect said space with said high pressure fluid when said control means is in a first position, and to connect said space with a lower pressure fluid when said control means is in a second position, the high pressure fluid in said chamber moving said valve member into a primary position when said space is connected to low pressure fluid, and the high pressure fluid in said space moving said valve member into a secondary position against the high pressure fluid in said chamber, said valve member having a restricted spiral passage in the wall thereof so placed as to connect said space with low pressure fluid when said valve member is in said primary position and to connect said space with said high pressure fluid when said valve member is in said secondary position; and means for moving said control means from said first position to said second position.

2. In a fluid motor having a piston operative within a cylinder member, the combination of: a valve member adapted to control the application of fluid under pressure to said piston, having a major portion and a minor portion of smaller cross-sectional area than said major portion; a valve body in which said valve member slides, said valve body fitting the major and minor portions of said valve member in fluid-tight relation; means forming a chamber adjacent the end of said minor portion of said valve member; means for maintaining fluid under high pressure in said chamber; walls forming a space adjacent the end of said major portion of said valve member; control means so formed as to connect said space with said high pressure fluid when said control means is in a first position, and to connect said space with a lower pressure fluid when said control means is in a second position, the high pressure fluid in said chamber moving said valve member into a primary position when said space is connected to low pressure fluid, and the high pressure fluid in said space moving said valve member into a secondary position against the high pressure fluid in said chamber; means for moving said control means from said first position to said second position; and a spring acting upon said valve member and tending to move it in one direction in said body when no fluid is supplied under pressure to either said chamber or said space.

3. In a fluid motor having a piston operative within a cylinder member, the combination of: a valve member adapted to control the application of fluid under pressure to said piston, having a major portion and a minor portion of smaller cross-sectional area than said major portion; a valve body in which said valve member slides, said valve body fitting the major and minor portions of said valve member in fluid-tight relation; means forming a chamber adjacent the end of said minor portion of said valve member; means for maintaining fluid under high pressure in said chamber; walls forming a space adjacent the end of said major portion of said valve member; control means so formed as to connect said space with said high pressure fluid when said control means is in a first position, and to connect said space with a lower pressure fluid when said control means is in a second position, the high pressure fluid in said chamber moving said valve member into a primary position when said space is connected to low pressure fluid, and the high pressure fluid in said space moving said valve member into a secondary position against the high pressure fluid in said chamber, there being a restricted passage in said valve member so placed as to connect said space with low pressure fluid when said valve member is in said primary position and to connect said space with said high pressure fluid when said valve member is in said secondary position; and means for moving said control means from said first position to said second position.

4. In a fluid motor having a piston operative within a cylinder member, the combination of: a valve member adapted to control the application of fluid under pressure to said piston, having a major portion and a minor portion of smaller cross-sectional area than said major portion; a valve body in which said valve member slides, said valve body fitting the major and minor portions of said valve member in fluid-tight relation, and said valve body having a high pressure fluid passage and a low pressure fluid passage therein; means forming a chamber adjacent the end of said minor portion of said valve member; means for maintaining fluid under high pressure in said chamber; walls forming a space adjacent the end of said major portion of said valve member; control means so formed as to connect said space with said high pressure fluid when said control means is in a first position, and to connect said space with a lower pressure fluid when said control means is in a second position, the high pressure fluid in said chamber moving said valve member into a primary position when said space is connected to low pressure fluid, and the high pressure fluid in said space moving said valve member into a secondary position against the high pressure fluid in said chamber, there being a single restricted passage in said valve member cooperating with said low pressure fluid passage to connect said space with low pressure fluid when said valve member is in said primary position and cooperating with said high pressure fluid passage to connect said space with said high pressure fluid when said valve member is in said secondary position; and means for moving said control means from said first position to said second position.

5. In a fluid motor having a piston operative within a cylinder member, the combination of: a valve member adapted to control the application of fluid under pressure to said piston, having a major portion and a minor portion of smaller cross-sectional area than said major portion; a valve body in which said valve member slides, said valve body fitting the major and minor portions of said valve member in fluid-tight relation, and said valve body having a high pressure fluid passage and a low pressure fluid passage therein; means forming a chamber adjacent the end of said minor portion of said valve member; means for maintaining fluid under high pressure in said chamber; walls forming a space adjacent the end of said major portion of said valve member; control means so formed as to connect said space with said high pressure fluid when said control means is in a first position, and to connect said space with a lower pressure fluid when said control means is in a second position, the high pressure fluid in said chamber moving said valve member into a primary position when said space is connected to low pressure fluid, and the high pressure fluid in said space moving said valve member into a secondary position against the high pressure fluid in said chamber, there being a single restricted passage cooperating with said low pressure fluid passage to connect said space with low pressure fluid when said valve member is in said primary position and cooperating with said high pressure fluid passage to connect said space with said high pressure fluid when said valve member is in said secondary position; and means for moving said control means from said first position to said second position.

6. In a fluid motor of the character described, the combination of: walls forming a cylinder; a main piston operative in said cylinder; a piston valve controlling the application of fluid pressure to said cylinder to move said main piston therein; a valve body having an opening in which said piston valve slides, there being a space formed adjacent the end of said piston valve; control means operating in timed relation to the movement of said main piston to alternately apply fluid pressure to and release fluid pressure from said space to move said piston valve in one direction into a primary position and to move said piston valve in the other direction into a secondary position; and restricted passage means formed in said valve for producing slow movement of said valve as it approaches one of said positions.

7. In a fluid motor of the character described, the combination of: walls forming a cylinder; a main piston operative in said cylinder; a piston valve controlling the application of fluid pressure to said cylinder to move said main piston therein; a valve body having an opening in which said piston valve slides, there being a space formed adjacent the end of said piston valve; and control means operating in timed relation to the movement of said main piston to alternately apply fluid pressure to and release fluid pressure from said space to move said piston valve in one direction into a secondary position and to move said piston valve in the other direction into a primary position, there being a restricted passage in said valve operating when said piston valve is in said secondary position to apply a valve locking fluid pressure to said space and connecting said space to low pressure fluid when said valve is in said primary position.

8. In a fluid motor of the character described, the combination of: walls forming a cylinder; a main piston operative in said cylinder; a tubular piston valve controlling the application of fluid pressure to said cylinder to move said main piston therein; and a valve body having an opening in which said piston valve slides and having a tubular wall extending into said valve, there being a space formed adjacent the end of said piston valve, a port in said tubular wall connecting with said space, and restricted passage means formed in the inner face of said valve for controlling the flow of fluid from said port to said space when said valve is in one of its positions in said valve body.

9. In a fluid motor of the character described, the combination of: walls forming a cylinder; a main piston operative in said cylinder; a tubular piston valve controlling the application of fluid pressure to said cylinder to move said main piston therein; and a valve body having an opening in which said piston valve slides and having a tubular wall extending into said valve, there being a space formed adjacent the end of said piston valve, ports in said tubular wall for conducting fluid to and from said space, and restricted passage means formed between the outer face of said tubular wall and the inner face of said valve for controlling the flow of fluid to and from said space as said valve approaches the ends of its movement in said valve body.

10. A valve mechanism for a fluid operated deep well pump having a fluid motor with a power piston operating in a cylinder and a pumping piston connected with said power piston, including: a pilot rod extending upwardly from said power piston and through the upper end of said cylinder; a tubular wall extending upwardly around said pilot rod, said wall having an upper port and a lower port therein; a tubular valve member around said tubular wall and said pilot rod; a valve body around said valve member, said valve body having ports therein connected with said cylinder; means for delivering a high pressure fluid into the upper end of said valve body and the upper end of said valve member, there being ports in said valve member for admitting said high pressure fluid to said ports of said valve body, and there being a space formed at the lower end of said valve member between said tubular wall and said valve body accessible through said ports of said tubular wall; port means in the upper portion of said pilot rod connecting with said upper port of said tubular wall when said rod is in lowered position to deliver high pressure fluid from the interior of said valve member to said space; port means intermediate the ends of said pilot rod for connection to said lower port of said tubular wall when said rod is in raised position; and walls forming a discharge passage connecting with said intermediate port of said rod when it is in connection with said lower port of said tubular wall, for the discharge of fluid from said space.

11. A device as defined in claim 10, in which said port means of said pilot rod consist of spiral channels in the circumferential face of said rod, such channels by their length producing a frictional head to restrict the flow of fluid therethrough while maintaining a cross-sectional area of passage sufficient to avoid clogging action.

12. A tubular valve member of the character described for use in a fluid motor, comprising: a tubular wall having a minor portion and a major portion respectively at opposite ends thereof; a spiral groove formed in the inner face of said major portion of said wall; a radial port connecting with the upper end of said spiral groove; passage means in the lower end of said major portion of said wall for connecting said groove with the lower end face of said wall; and ports in said minor portion of said tubular wall for controlling the passage of high pressure fluid.

13. A tubular valve member of the character described for use in a fluid motor, comprising: a tubular wall having a minor portion and a major portion respectively at opposite ends thereof, there being a shoulder between said major and minor portions and a flat annular recess in said minor portion adjacent said shoulder; a spiral groove formed in the inner face of said major portion of said wall; a radial port connecting with the upper end of said spiral groove; passage means in the lower end of said major portion of said wall for connecting said groove with the lower end face of said wall; and ports in said minor portion of said tubular wall for controlling the passage of high pressure fluid.

14. A tubular valve member of the character described for use in a fluid motor, comprising: a tubular wall having a minor portion and a major portion respectively at opposite ends thereof, there being a shoulder between said major and minor portions and a flat annular recess in said minor portion adjacent said shoulder, the walls at the ends of said recess being relieved in a manner to permit restricted flows of fluid; a spiral groove formed in the inner face of said major portion of said wall; a radial port connecting with the upper end of said spiral groove; passage means in the lower end of said major portion of said wall for connecting said groove with the lower end face of said wall; and ports in said minor portion of said tubular wall for controlling the passage of high pressure fluid.

15. A tubular valve member of the character described for use in a fluid motor, comprising: a tubular wall having a minor portion and a major portion respectively at opposite ends thereof, there being a shoulder between said major and minor portions and a flat annular recess in said minor portion adjacent said shoulder; a radial port in said major portion intermediate the ends thereof and a restricted passage connecting said radial port with the lower end face of said major portion; and ports in said minor portion of said tubular wall for controlling the passage of high pressure fluid.

16. A valve mechanism for a fluid operated deep well pump having a fluid motor with a power piston operating in a cylinder and a pumping piston connected with said power piston, including: a valve casing axially aligned with said cylinder and at one end thereof having ports connected through passages with said cylinder; a tubular fluid operated valve member in said casing having valve ports to cooperate with said ports of said casing; and means for applying fluid pressure to said valve member to move the same, said means being so formed that the movement of said valve member will be slowed at a point just before the arrival of said valve ports at said casing ports so that the opening of said valve ports will be initiated slowly.

17. A fluid motor of the character described, including: a power piston; a cylinder body having a cylinder receiving said piston, said body having a fluid passage leading from one end of said cylinder to one end of said body and a fluid passage leading from the other end of said cylinder to said end of said body; a valve body connected to said end of said cylinder body and in axial alignment therewith, said valve body having body ports connecting with said fluid passages of said cylinder body, and said valve body having a pressure fluid passage and a discharge passage adapted to be alternately connected to said body ports of said valve body; a valve member movable between primary and secondary positions in said valve body, said valve member being in axial alignment with said piston and having valve port means for alternately connecting said pressure fluid passage and said discharge passage with said body ports; and control means connected to said piston so as to operate in timed relation therewith, said control means applying fluid pressure to said valve member to move the same alternately between said primary and secondary positions, said valve member having means operating to slow its movement as it approaches the positions in which said valve ports open said body ports.

18. A fluid motor of the character described, including: walls forming a cylinder; a main piston operative in said cylinder; a valve device at the end of said cylinder controlling the application of fluid under pressure to said cylinder to move said piston therein, said valve device having a piston valve adapted to be moved by fluid pressure; and a pilot rod projecting from said main piston into said valve device for controlling fluid to move said piston valve, said pilot rod having a restricted fluid passage therein for delivering a controlled flow of fluid under pressure to said piston valve to move the same.

19. A fluid motor of the character described, including: walls forming a cylinder; a main piston operative in said cylinder; a valve device at the end of said cylinder controlling the application of fluid under pressure to said cylinder to move said piston therein, said valve device having a piston valve adapted to be moved by fluid pressure; and a pilot rod projecting from said main piston in said valve device for controlling fluid to move said piston valve, said pilot rod having a spiral fluid passage therein for delivering a controlled flow of fluid under pressure to said piston valve to move the same.

20. A deep well fluid motor of the character described, including: walls forming a cylinder, said walls having a fluid passage therein communicating between one end of said cylinder and an end of said walls; a piston operative in said cylinder; a valve casing at said end of said cylinder walls and in axial alignment therewith, said valve casing having an inner and an outer wall; a valve member movable in said casing and having a portion thereof projecting between said inner and outer walls and forming a sliding fluid-tight fit therewith, said valve member being provided with passages therein adapted to cooperate with passages in said valve casing and with said fluid passage to provide a flow of pressure fluid through said fluid passage to said cylinder to actuate said piston, movement of said valve member varying said flow of pressure fluid; means for moving said valve member in said casing; and means for cushioning the end movement of said valve member.

21. In a deep well pump, the combination of: walls forming a cylinder; a piston operative in said cylinder; a valve body member at one end of said cylinder having a bore therein; a valve member in said bore movable between two positions to control the application of pressure fluid to said piston, there being a spiral restricted passage in one of said members to control the flow of pressure fluid to one end of said valve member to move said valve member; and means for permitting said fluid to flow through said passage.

22. In a deep well pump adapted to be operated in a well having a relatively small diameter, the combination of: walls forming a vertical cylinder, there being cylinder passages in said walls communicating between one end of said walls and each end of said cylinder; a piston operative in said cylinder; a vertical column of high pressure fluid; a vertical column of low pressure fluid; a valve body at said one end of said walls having valve passages connecting with said cylinder passages and having an inner tubular member spaced therefrom; a valve element movable in said valve body and at least partially extending into said space in fluid-tight relation with said valve body and said valve member, said valve element having openings therein adapted to connect said valve passages alternately with said column of high pressure fluid and said column of low pressure fluid so as to reciprocate said piston; means for moving said valve element in said valve body; and means for controlling the movement of said valve element.

CLARENCE J. COBERLY.

CERTIFICATE OF CORRECTION.

Patent No. 2,204,120.                                         June 11, 1940.

CLARENCE J. COBERLY.

It is hereby certified that error appears in the printed specification of the above numbered patent requiring correction as follows: Page 4, first column, line 35, strike out the word "rod" and insert the same after "pilot" in line 36; and that the said Letters Patent should be read with this correction therein that the same may conform to the record of the case in the Patent Office.

Signed and sealed this 30th day of July, A. D. 1940.

(Seal)

Henry Van Arsdale,
Acting Commissioner of Patents.